June 22, 1937.   R. STAHL   2,084,784
EMBEDDING OF ABRASIVE AND LIKE PARTICLES IN RUBBER
Filed Jan. 25, 1936
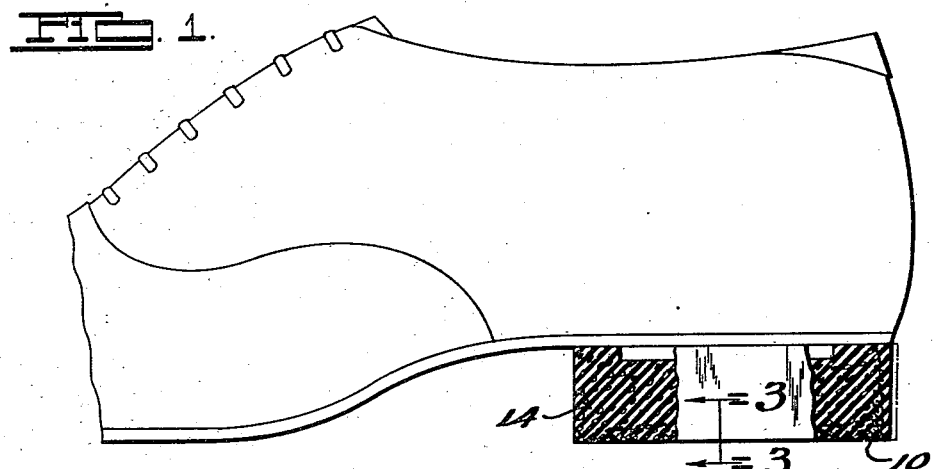
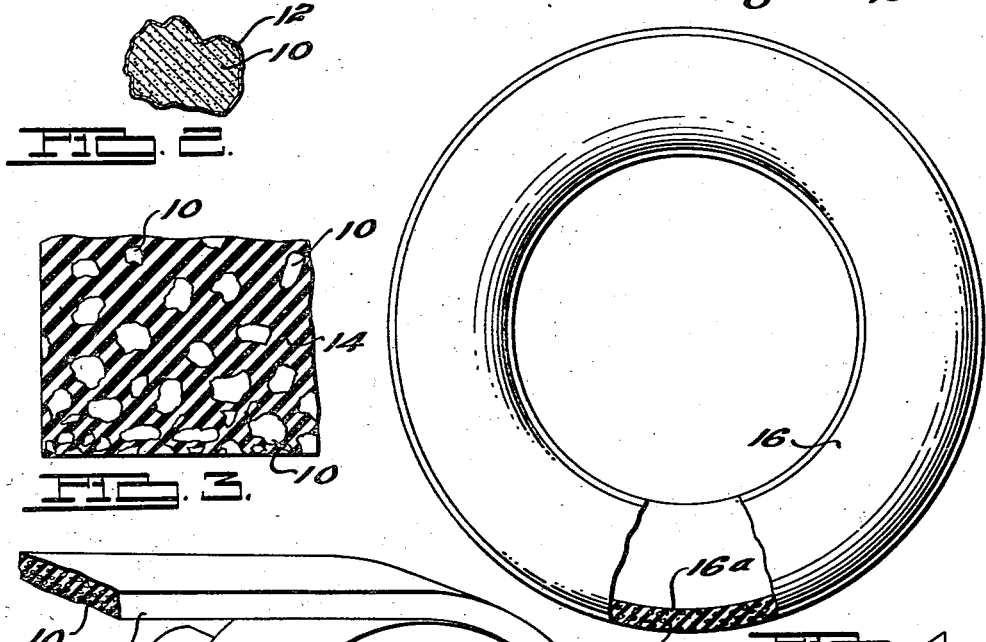
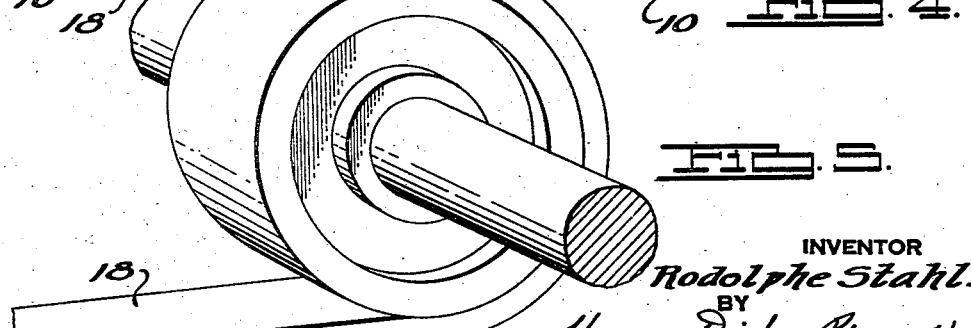
INVENTOR
Rodolphe Stahl.
BY
Harness, Dickey, Pierce & Hann
ATTORNEYS.

Patented June 22, 1937

2,084,784

UNITED STATES PATENT OFFICE 2,084,784

EMBEDDING OF ABRASIVE AND LIKE PARTICLES IN RUBBER

Rodolphe Stahl, Detroit, Mich.

Application January 25, 1936, Serial No. 60,790

4 Claims. (Cl. 106—23)

The present invention relates to abrasive and frictional articles or surfaces and to processes of making the same, and in particular provides an improved process for embedding abrasive and like particles in rubber or equivalent compositions and an improved resulting article or surface.

Objects of the present invention are to provide an improved composite material which may combine abrasive and frictional properties with resiliency and/or flexibility, as well as to provide a simple and economical process of making the same; to provide an article as above stated, which may be molded or otherwise formed into any of a wide variety of shapes, depending upon the use to which the article is put, illustrative uses including treads for boots and shoes, vehicle tires, belting and the like.

Further objects of the present invention are to provide an improved such article formed of rubber or equivalent composition, having abrasive or gritty particles embedded therein and positively and permanently bonded thereto; to provide a process for positively bonding such particles to rubber or the like, the bond being able to withstand severe stresses between the particles and the rubber, such as are occasioned in the use of shoe treads, vehicle tires, belting and the like; and to provide an article as above stated and process for making the same, in which the particles are bonded to the rubber by vulcanization, an intermediate binder being used between the rubber and the particles, which intermediate binder is positively and permanently vulcanizable to the rubber and which may be positively and intimately associated with the particles.

Further objects of the present invention are to provide an article and process for making the same in which the intermediate binder is a metal such as brass having the property of being positively and permanently vulcanizable to rubber, and which may be plated upon the abrasive particles, which particles may be of any hard or gritty substance capable of receiving a plating coat of the intermediate binder, such, for example, as a silicon-carbide sold under the trade name "carborundum," iron, or steel.

Further objects of the present invention appear in the following description and in the appended claims.

Heretofore a wide variety of abrasive, friction or polishing materials or articles have been produced, of the general class to which the material and process of the present invention relate and comprising in general granular abrasive matter bonded together by a composite binder, such as rubber. The usual method of making articles of this type has involved either the mixing of the abrasive material with the rubber and other constituents by the use of mixing or calender rolls, or by softening the rubber with a suitable solvent, mixing it with the abrasive material and other constituents, and thereafter coagulating or drying the mixture. The resulting mixture of rubber and abrasive has then been rolled into sheets or otherwise shaped, and finally vulcanized.

In the resultant articles, the abrasive particles are held mainly by locking engagement with each other, the vulcanization producing little or no permanent bond between the rubber and the abrasive particles, it being appreciated that the usual abrasives such as silicon-carbide, iron or steel, have little or no capacity for vulcanization with rubber. It will be understood, therefore, that where the article is used as a grinding wheel or polishing wheel, the surface particles lose their locking engagement as the wheel wears down and are thrown off the wheel. Similarly, where the article is subject to severe wear, as when used as the treads for shoes, and for vehicle tires, the continual flexing of the article in use tends to loosen and destroy the locking engagement, permitting the abrasive particles to free themselves and become lost. In response to a severe frictional load, also, as in bringing an automobile to rest, the particles are forcibly pulled from the rubber by the friction between the particles and the supporting roadway.

With a view to overcoming the failure of the rubber or rubber composition to cohere or positively bond to the surfaces of both of the ordinary abrasive materials, it has been proposed heretofore to utilize an intermediate binder between the respective particles and the rubber, which intermediate binder is desired to have the property of forming a positive bond with the rubber, and also to have a positive and cohering union with the surface of the abrasive particles. In accordance with the disclosure of United States Patent No. 1,668,476, granted May 1, 1928, to Wescott, it is proposed to use plastic materials as the intermediate binder.

It has been found, however, in practice, that the plastic intermediate binder does not constitute an entirely satisfactory solution to the problem of positively bonding the rubber to the abrasive particles, and that the bond produced thereby is not positive or permanent enough to render the article suitable for many applications.

In its broader aspects, therefore, the present invention is directed to the provision of an abrasive article which may embody both resilient and flexible characteristics, formed of rubber or similar compositions, and carrying embedded abrasive particles, which particles are positively and permanently bonded with the rubber. In its narrower aspects, the present invention is directed principally to the provision of an improved intermediate binder, having the property of being vulcanizable to rubber or similar compositions and of forming a positive and permanent union with the surface of the abrasive particles. A preferred, but illustrative, embodiment of the present invention is described hereinafter, and certain of the features thereof are shown in the accompanying drawing, throughout which corresponding reference characters are used to designate corresponding parts, and in which:

Figure 1 is a fragmentary view, illustrating the application of the present invention to the formation of heels for shoes;

Figure 2 is a sectional view of an abrasive particle, illustrating the relation thereto of the intermediate binder;

Figure 3 is an enlarged sectional view taken along the line 3—3 of Figure 1;

Figure 4 is a view, partly in section, illustrating the application of the present invention to vehicle tires; and Figure 5 is a view in perspective, partly in section, illustrating the application of the present invention to transmission belting.

In accordance with the present invention, prior to the mixing with or embedding in the rubber or rubber composition of the abrasive particles, the abrasive particles are given a plate or coating of metal, the metal selected being one which forms a positive and permanent union with the particle surfaces and which also has the property of forming a positive bond by vulcanization with the rubber or rubber composition. A preferred such metal is brass, it being well known that rubber may be vulcanized to brass and provide an excellent and positive bond, and also that brass may be uniformly and economically plated upon the usual abrasives, such as carborundum, iron or steel, without prospect of the coat or plate scaling away therefrom. The coat or plate forms a permanent layer or intermediate binder between the rubber or rubber composition and the abrasive particles, and thus permits the use as an abrasive, of any material susceptible to a plating operation, it being preferred, however, to utilize a silicon-carbide such as that sold under the trade name "carborundum", iron or steel. The resulting articles represent a marked improvement over those heretofore produced, so far as the present applicant is aware.

The plating of the abrasive particles with the intermediate binder may be effected in any conventional way, it being understood, of course, that it will be desirable to agitate the particles in the plating solution during the plating operation, in order to prevent the respective particles from bonding with each other, and resulting either in an undesirably large collected mass which must later be broken up, or in leaving portions of the surface of each particle in an unplated condition.

The resulting plated granules, one of which is shown in Figure 2, in which the particle 10 is provided with a continuous surface coat of the intermediate binder 12, may be mixed with or otherwise embedded in the rubber or rubber composition and the mass ultimately vulcanized and shaped, certain of which are mentioned above, and which, in their details, form no part of the present invention.

As will be appreciated, the concentration of the particles in the rubber or composition may be varied between relatively wide limits, dependent upon the use to which the article is to be put. Similarly, the distribution of the particles may be uniform throughout the composition or may vary in any desired way.

In practicing the present invention in making heels for shoes, as illustrated in Figure 1, it is considered preferable to concentrate the particles 10 in the region of the bottom of the heel 14 and to materially reduce the concentration of the particles throughout the remainder of the body of the heel. With this arrangement, a maximum resiliency and flexibility of the heel is preserved, while at the same time the underside thereof, which is subjected to wear, is provided with a highly abrasive or frictional surface. The preferred variation in concentration is illustrated in Figure 3, which represents an enlarged sectional view taken through an enlarged view in vertical section, taken through the heel 14 of Figure 1. It is also preferred to leave a margin 15 around the heel to allow for a trimming operation in fitting the heel.

The application of the present invention to vehicle tires is illustrated in Figure 4, in which the tire 16, of otherwise conventional construction, is provided with an outer tread portion 16a, in which a plurality of the abrasive particles 10 are embedded in the manner described above. Preferably, the abrasive section of the tire is confined to the tread portion thereof, in order not to impair the resiliency or flexibility of the side walls of the tire. Figure 5 illustrates the application of the present invention to belting, in which figure the belt 18 is provided with the abrasive particles 10 embedded therein in the previously described manner. Preferably, the concentration of the particles is greatest on the inner or active side of the belt, and is reduced as the outer surface of the belt is approached, in order to not unnecessarily reduce the flexibility thereof.

Although the present invention has been described specifically, it will be evident that various modifications in the details thereof, as well as various modifications in the mode of practicing it, may be made within the spirit and scope thereof. The foregoing description, accordingly, is to be regarded in an illustrative and not in a limiting sense.

I claim as my invention:

1. As an article of manufacture, a rubber composition matrix having embedded therein but exposed upon the surface thereof granular abrasive matter, each granule having a metal coat plated thereto and vulcanized to the rubber, so that said granules are positively retained in said surface to increase the frictional properties thereof.

2. As an article of manufacture, a rubber composition matrix having embedded therein but exposed upon the surface thereof granular abrasive matter, each granule having a metal coat plated thereon and said rubber composition being vulcanized to said granule coats, so that said granules are positively retained in said surface to increase the frictional properties thereof.

3. As an article of manufacture, a rubber composition matrix having embedded therein but exposed upon the surface thereof granular abrasive matter, each granule having a metal surface vulcanized to the rubber and cohering the associated granule thereto, so that said granules are positively retained in said surface to increase the frictional properties thereof.

4. As an article of manufacture, a rubber composition matrix having distributedly embedded therein and exposed upon the surface thereof granular abrasive matter, each granule having a metal surface vulcanized to the rubber and cohering the associated granule thereto, so that said exposed granules are positively retained in said surface to increase the frictional properties thereof.

RODOLPHE STAHL.